United States Patent Office 2,974,168
Patented Mar. 7, 1961

2,974,168

PROCESS FOR MAKING METHYLENEDIANILINE

Dexter B. Sharp, Vandalia, and Floyd B. Erickson, Dayton, Ohio, assignors to Monsanto Chemical Company, St. Louis, Mo., a corporation of Delaware No Drawing. Filed Sept. 19, 1955, Ser. No. 535,260

1 Claim. (Cl. 260—570)

This invention relates to an improvement in the process of making methylenediaromatic amines by reacting an aromatic amine, particularly an aniline, with a source of formaldehyde, the improvement being that high boiling material from the reaction, particularly high boiling distillate, is subjected to further reaction with aniline, such as by returning the material as part of a subsequent charge. The present improvement makes it possible to substantially increase the yields over those which would otherwise be obtained.

Methylenedianiline is the starting material for an isocyanate, 4,4'-diisocyanatodiphenylmethane, which is used extensively in the production of synthetic resin materials. The copending application of Floyd B. Erickson, Serial No. 535,259, filed of even date herewith, now U.S. Patent No. 2,818,433, teaches a process in which methylenedianilines are prepared by reacting formaldehyde with more than 100% stoichiometric excess of an acid salt of an aniline. The present improvement is applicable not only to that process, but also to reactions of aniline and formaldehyde in which a smaller, or no excess of aniline is used, for example to the reaction of a 2 to 1 molar ratio of aniline to formaldehyde. The use of high boiler will improve the yield when the initial condensation is in alkaline or neutral media, and at room temperature, as well as when the entire reaction is conducted in an acid medium.

The present procedure is applicable not only to aniline, but to other aromatic amines, including substituted anilines, such as aniline which is substituted with alkyl groups, for example, ethyl, methyl, propyl, butyl, etc., and which contains no more than two substituents in the ortho- and para- positions, in order to leave at least one active position free for coupling. It is preferred that the para position be free. The amino nitrogen can also be substituted with alkyl substituents as in N-methylaniline, N-propylaniline, N-butylaniline, N-isobutylaniline, N-isoamylaniline, N-hexylaniline, N,N-diethylaniline, N,N-dibutylaniline, etc. Among the alkyl groups which can be substituted on the ring are methyl, ethyl, propyl, isopropyl, butyl, isobutyl, secondary butyl, tertiary butyl, n-amyl, isoamyl, tertiary amyl, n-hexyl, decyl, dodecyl, etc. The ring also can contain alkoxy substituents such as methoxy, ethoxy, isopropoxy, butoxy, hexyloxy, etc. radicals, or halogen substituents, such as bromine, chlorine and fluorine. Examples of a few of the anilines to which the present process is applicable are the following: o-toluidine, m-toluidine, p-toluidine, 2,6-dimethylaniline, 2,6-diethylaniline, 2,6-diisobutylaniline, o-pentylaniline, m-pentylaniline, o-chloroaniline, m-chloroaniline, o-bromoaniline, o-anisidine, m-anisidine, N-ethyl-o-toluidine, and N,N-dimethyl-o-toluidine. The preferred anilines are those containing no substituents other than alkyl substituents, and particularly when the para position is free. However, if most of the active positions in the aniline were substituted, the use of high boiler would probably not give a great improvement in yield, as the aniline would be sufficiently substituted to minimize formation of polynuclear high boiling materials, which are believed to be present in the high boiler.

Example 1

This example shows results obtained when no high boiler is added, and the molar ratio of aniline to formaldehyde is 3 to 1.

Aniline hydrochloride was formed in situ by adding 3 moles of aniline to 3 moles of hydrochloric acid, and then 1 mole of 37% aqueous formaldehyde was added at 65 to 70° C. The mixture was heated at 65 to 70° C. for 0.5 hour. The yield of methylenedianiline based on unrecovered aniline was 70.3%, and based on formaldehyde, 65.9%.

Example 2

3.0 moles of aniline and 43.6 grams of high boiler from previous runs was added to 3.43 moles of HCl. The extra HCl was to convert the high boiler to a salt. 1 mole of 37% aqueous formaldehyde solution was added at 65 to 70° C. in 1 hour. The mixture was heated at 65 to 70° C. for 5 hours. The mixture was neutralized, the amine layer was separated, and the methylenedianiline was separated by distillation. The yield was 81.3% based on aniline and 78.4% based on formaldehyde. The product assayed 98.5% methylenedianiline.

The addition of high boiler in Example 2 improved the yield considerably over that of Example 1.

Example 3

This example illustrates the results obtained without the addition of high boiler, when a 6 to 1 molar ratio of aniline to formaldehyde is used. The formaldehyde solution was added to the aniline hydrochloride at 65 to 70° C. in 1 hour, and the mixture was heated for an additional hour. The product was separated as in Example 2. The yield was 82.2% based on aniline, and 83.4% based on formaldehyde, and the assay was 96.7%. The yield of high boiler was 12.9 grams. In a similar procedure except that a heating time of 5 hours was used, the yield was 82.2% based on aniline and 85.5% based on formaldehyde, and the assay was 99.8%.

Example 4

6 moles of aniline with 41.2 grams of high boiler was added to 6.4 moles of 37% aqueous HCl. The high boiler was obtained from previous runs by taking a cut at 230 to 290° C. at 0.4 to 1.0 mm. Hg, after the methylenedianiline cut at 170–180° C. at 0.3 mm. Hg 1 mole of 37% aqueous formaldehyde was added at 65 to 70° C. in 1 hour, and the mixture was further heated for 5 hours. The mixture was diluted with 600 ml. water, heated to 70 to 80° C. and neutralized with 3.4 moles of sodium carbonate. The amine layer was separated, excess aniline was distilled off, and the methylenedianiline was distilled. 39.9 grams of high boiler was then distilled from the reaction mixture. The yield was 88.3% based on aniline and 92.7% based on formaldehyde, and the product assayed 97.6% methylenedianiline.

The use of high boiler in Example 4 greatly improved the yield over that of Example 3.

It has been indicated by a prior investigator (Wagner, J.A.C.S. 56, 1944 (1934)) that the high boiler obtained in the preparation of methylenedianiline (B.P. 329–340° C./1–2 mm. Hg) is a mixture of tri- and tetra-nuclear bases, e.g., $C_{20}H_{21}N_3$ and $C_{27}H_{28}N_4$, on the basis of molecular weight and nitrogen analyses.

Example 5

In this example, high boiler was reacted with aniline hydrochloride. The high boiler was redistilled to insure freedom from methylenedianiline, and a cut was taken at 250–280° C. at 0.3–0.4 mm. Hg. A mixture of 107.1 grams (0.353 mole assuming an empirical formula of $C_{20}H_{21}N_3$) of high boiler, 400.3 grams (4.06 moles) of 37% aqueous hydrochloric acid and 279.3 grams (3.0 moles) of aniline was heated at 65 to 72° C. for 24 hours. The neutralization and separation procedure of Example 4 was then followed. 30.9 grams of product was obtained which was assayed by infrared analysis as 94.9% methylenedianiline. There was also obtained a high boiling fraction of 73.5 grams.

The preparation of methylenedianilines in which the initial condensation takes place under alkaline or neutral conditions is also possible as illustrated by the following example.

*Example 6*

3 moles of aniline, 0.756 mole of potassium hydroxide and 75 grams of ethanol were mixed and heated to 90–100° C. and 1 mole of 37% aqueous formaldehyde was added in 0.66 hour at that temperature and the mixture was heated at 85 to 90° C. for 0.5 hour. Then, 3.76 moles of 37% aqueous hydrochloric acid was added, and the mixture was heated at 91° C. for 12 hours. The yield was 81.5% based on aniline, and 50.6% based on formaldehyde and the assay was 88.4% methylenedianiline. The yield of high boiler was 18.4 grams, the material having a boiling range of 220 to 290° C. at 0.8 to 1.0 mm.

It has been reported (Drozdov, J. Gen. Chem. (USSR), 1, 1171 (1931); Chem. Abst. 26, 5293 (1932)) that the course of the action of aniline with formaldehyde depends only on the pH of the reaction medium. Above pH 7, N,N'-diphenylmethanediamine $$(C_6H_5NHCH_2NHC_6H_5)$$

is the product and below pH 7, anhydroformaldehydeaniline is the product, in reactions at room temperature or below.

The above two compounds were isolated and reacted with aniline by heating under acid conditions. Methylenedianiline was produced in both cases.

It is preferred to conduct the entire reaction in an acid medium, because the procedure is more simple, and the yield is better. However, from the similarity of the boiling points of high boiler obtained by different procedures, and from the further fact that probable intermediates in different procedures may be converted to methylenedianiline, it can be concluded that the addition of high boiler will improve the yield regardless of the type of initial condensation procedure.

The present improvement may be used with all reactions of aniline and formaldehyde in which the molar ratio of aniline to formaldehyde is at least 2 to 1. However, the yield is better if more than 100% stoichiometric excess aniline is used, up to 10 molar parts of aniline to 1 of formaldehyde. The range from 6 to 10 molar parts of aniline to formaldehyde is preferred and 6 parts is especially preferred.

Hydrochloric acid is the preferred acid, although other mineral or organic acids may be used, e.g., sulfuric acid or acetic acid, although they are less satisfactory.

The amount of high boiler which is added may be varied, depending partly on the amount available, although 5 to 7% of the aniline charge has been found a convenient amount. A substantial amount should be added in order to have an effect, but it should not constitute the major part of the reaction mixture.

While formaldehyde itself is the preferred reactant, other known sources of formaldehyde such as methylal or paraformaldehyde may be used. While amounts of acid approximately stoichiometrically equivalent to the aniline and high boiler are preferred, the addition of high boiler will improve the yield when greater or lesser amounts of acid are used. The high boiler is assumed for purposes of calculation to have an empirical formula of $C_{20}H_{21}N_3$ and to have three nitrogens capable of forming an acid salt.

The heating time may be varied considerably, from 1 to 5 hours or more having been found satisfactory, at temperatures from 50 to 90° C. Preferred temperatures are in a 60 to 75° C. range.

While sodium carbonate was selected as a convenient base for neutralization, other alkalies may be used, such as sodium hydroxide, potassium hydroxide, ammonium hydroxide, etc., or alkaline earth oxides or hydroxides such as lime, etc., or any other common bases.

While it is preferred that the high boiling material be separated from other residue before subjecting it to further reaction with aniline and formaldehyde, it is possible to merely add aniline, or aniline and formaldehyde, along with the other ingredients, to the entire residue left after distilling the methylenedianiline from the water-insoluble amine layer; or it is possible to simply return all of this high boiling reaction product to the reaction. Of course, if the process is made continuous, all of the reaction product of boiling point higher than the desired methylenedianiline can be recycled, or only the high boiler of a specific boiling range can be recycled, and other residue can be drained periodically from the still pot. Of course, the excess aniline can also be recycled.

No effort was made to determine the isomer content of the products. It has been reported that crude undistilled methylenedianiline can be prepared in a 9:1 mixture of the 4,4'- and 2,4'-derivatives. It was assumed that the 4,4'-derivative would be the predominant product unless the para position was blocked, in which case coupling would take place at the ortho positions.

The high boiling material which is used in the preparation of methylenedianiline will usually boil within the range of 200 to 300° C. at 0.3 to 2 mm. Hg.

An improvement in the process of reacting aromatic amines with formaldehyde to prepare methylenediaromatic amines has been described. While certain preferred embodiments are illustrated, it will be appreciated that the use of high boiler would be advantageous under other conditions, and that numerous variations and modifications are possible without departing from the invention.

We claim:

The process of preparing 4,4'-methylenedianiline which comprises reacting at least 2 moles of aniline with 1 mole of formaldehyde, distilling the methylenedianiline from the resulting product, separating some material boiling higher than methylenedianiline from other residue by distillation, adding this higher boiling material to another charge of aniline, adding formaldehyde to the resulting mixture, and heating to form the methylenedianiline.

References Cited in the file of this patent

UNITED STATES PATENTS

| | | |
|---|---|---|
| 471,659 | Vongerichten | Mar. 29, 1892 |
| 541,859 | Koreff | July 2, 1895 |
| 763,756 | Homolka | June 28, 1904 |
| 1,799,722 | Arnold | Apr. 7, 1931 |
| 1,803,331 | Kladivko | May 5, 1931 |
| 1,932,518 | Hale | Oct. 31, 1933 |
| 2,034,491 | Sloan | Mar. 17, 1936 |
| 2,818,433 | Erickson | Dec. 31, 1957 |

FOREIGN PATENTS

| | | |
|---|---|---|
| 58,955 | Germany | Sept. 7, 1891 |
| 70,402 | Germany | July 19, 1893 |
| 270,663 | Germany | Feb. 21, 1914 |